United States Patent
Frisbee

[15] 3,685,592
[45] Aug. 22, 1972

[54] FLUID CUSHIONED DOZER BLADE

[72] Inventor: Claude M. Frisbee, Burlington, Iowa

[73] Assignee: J. I. Case Company, Racine, Wis.

[22] Filed: Sept. 15, 1970

[21] Appl. No.: 72,368

[52] U.S. Cl. ..................172/801, 172/755, 37/19
[51] Int. Cl. ..........................E02f 3/76, A01b 15/00
[58] Field of Search ....172/801, 803, 755; 37/18, 19, 37/48, 117.5

[56] References Cited

UNITED STATES PATENTS

| 2,753,638 | 7/1956 | Mork | 172/803 |
|---|---|---|---|
| 2,436,956 | 3/1948 | Du Pras | 37/19 X |
| 266,121 | 10/1882 | Etzler | 178/755 |
| 222,437 | 11/1940 | Lykken | 37/19 |
| 194,231 | 8/1877 | English et al. | 172/755 |

Primary Examiner—Robert F. Pulfrey
Assistant Examiner—Stephen C. Pellegrino
Attorney—Cullen, Settle, Sloman & Cantor

[57] ABSTRACT

An earth moving blade assembly for a dozer or the like earth working machine has a cutting portion at the ground-engaging end of the blade and a moldboard portion closely spaced above the upper end of the cutting portion. A fluid chamber is provided at the rear of the blade assembly which is in communication with a source of fluid under pressure and this chamber is provided with a plurality of apertures or orifices extending toward the soil contacting surface of the blade assembly moldboard, which apertures are positioned such as to provide a continuous fluid film over the entire moldboard surface when the chamber is pressurized. The resultant fluid film prevents adhesion of the soil moved from the cutting portion to the moldboard portion of the blade assembly and considerably reduces friction resistance during the earth moving operation of the blade assembly.

4 Claims, 4 Drawing Figures

Patented Aug. 22, 1972

INVENTOR.
CLAUDE M. FRISBEE.
BY
CULLEN, SETTLE, SLOMAN & CANTOR.
ATT'YS.

INVENTOR.
CLAUDE M. FRISBEE.
BY
CULLEN, SETTLE, SLOMAN & CANTOR
ATT'YS.

FLUID CUSHIONED DOZER BLADE

BACKGROUND OF THE INVENTION

The present invention relates to earth working implements and more particularly to an earth moving blade assembly such as is used by a dozer or scraper or other earth working machine.

In conventional earth working machines employing earth moving blades, such as dozers or scrapers, the mass of earth or soil, after being broken loose from the ground by the blade, must slide directly along the face of the moldboard of the blade, causing considerable friction between the soil and the face of the blade which is compounded by the quantity and weight of the mass of soil moved by the blade. Additionally, the inherent adhesion characteristic of the soil causes a large quantity of soil to adhere to the surface of the blade which is difficult or impossible to remove by the following masses of soil broken loose by the blade. This condition greatly reduces the earth moving capacity of the blade and requires increased horsepower to move the blade through the ground.

For the foregoing reasons, it has been proposed, particularly in connection with plow blades, to provide some means, such as steam or fluid, to lubricate or otherwise prepare the soil contacting surface of the blade to reduce adhesion and friction between the soil and the blade surface.

In all of the presently known fluid pressure arrangements for earth moving blades, the arrangements are such that fluid pressure is applied in a direction squarely against the mass of soil moved by the blade which is undesirable and of great disadvantage. The pressurized fluid directed squarely at the mass of soil moved by the blade, (although intended to keep the soil from sticking to the blade) (1) is not capable of providing a complete fluid film or fluid cushion across the entire surface of the blade along which the mass of soil has to move, because of the direction in which the fluid exits from the surface of the blade, and (2) generates a considerable reaction thrust force in a direction opposite to the direction in which the blade moves through the ground. Thus, instead of reducing the resistance, the prior art devices increase the resistance against the blade. Obviously, this considerably slows the earth moving operation, and reduces the ability of the blade to move large quantities of soil in a single pass, unless increased horsepower is provided to move the blade through the ground to compensate for the additional reaction thrust resistance.

A further serious disadvantage in the known arrangement has been found to reside in the location of the orifice openings in the surface of the blade which are left unprotected against the soil and subsequently cause clogging of the orifices by particles of the soil.

In order to eliminate or reduce the foregoing disadvantages in a fluid ejection arrangement for earth moving blades the present invention provides an improved earth moving blade in which a continuous fluid cushion is provided substantially over the entire soil-contacting surface of the blade to thereby substantially eliminate friction between the mass of soil and the blade and prevent adhesion of the soil to the surface of the blade.

SUMMARY OF THE INVENTION

The present improved earth moving blade assembly is composed of a mold portion and a soil digging and cutting portion below the mold portion which are connected together by a housing defining a fluid chamber at the rear of the assembly which is suitably connected by a conduit to a source of fluid pressure such as a compressor or pump operated by the prime mover of the machine with which the blade of the present invention is associated. A plurality of orifices are provided extending from the fluid chamber to the surface of the earth moving blade between the soil digging and cutting portion and the moldboard portion of the blade for introduction of fluid to the soil-engaging surface of the blade. The adjacent edges of the moldboard portion of the blade and of the soil digging and cutting portion are spaced from each other around the orifices. Further, the upper edge of the cutting portion of the blade is contoured (in relation to the axial direction of the orifices) or a separate deflector means may be provided adjacent the orifices so as to direct the fluid ejected from the orifices upwardly along the moldboard portion of the blade. This arrangement provides a fluid film or fluid cushion substantially over the entire surface of the moldboard portion of the blade and prevents soil particles from clogging the orifices. Thus, the mass of soil cut loose by the cutting portion of the blade assembly moves upwardly towards the moldboard portion of the blade. There the mass of soil is caused to slide along a cushion of fluid, to be thrown off from the upper edge of the moldboard portion of the blade by following masses of soil as the blade moves through the ground. The fluid cushion along the moldboard portion of the blade is continuously replenished without interruption as long as the blade is moving through the ground.

By this improved construction and arrangement of the present earth moving blade assembly, friction between the surface of the blade and the soil is substantially eliminated and the soil is prevented from adhering to the surface of the moldboard or the blade. This causes a significant increase in the dozer's or other machine's ability to make deep cuts through the ground and move large quantities of earth in one pass.

The improved construction and arrangement of the earth moving blade of the present invention will be best understood by reference to the following detailed description in reference to a preferred embodiment schematically illustrated in the accompanying drawings.

DESCRIPTION OF THE PREFERRED EMBODIMENT

Figure 1:
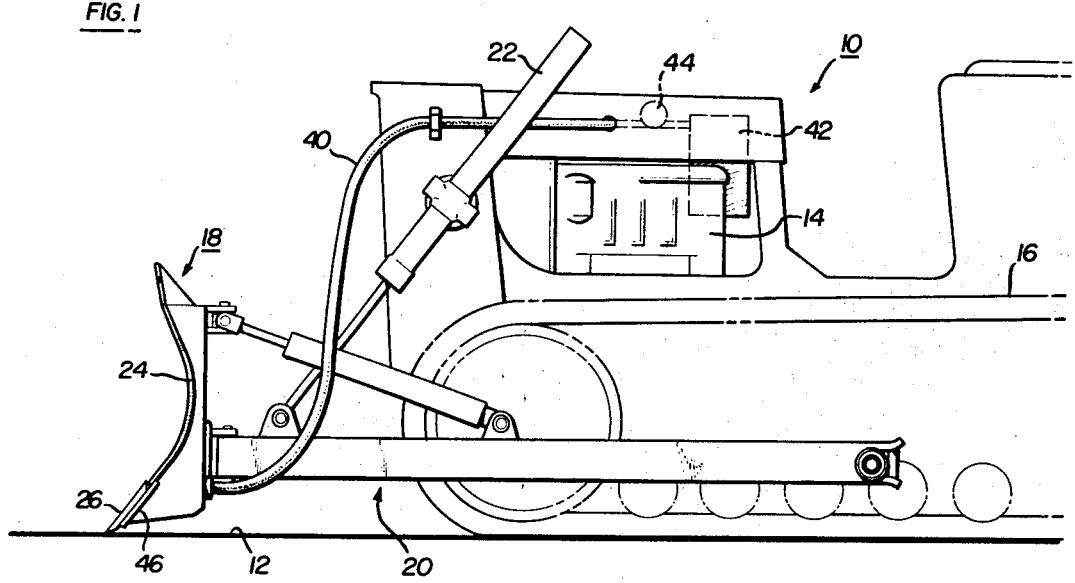
FIG. 1 is a schematic side elevation view of an earth moving machine embodying the present improved earth moving blade.

With particular reference to FIG. 1, the present invention is illustrated, for example, only as being embodied for use in an earth moving machine such as a dozer 10, which is powered for travel along the ground 12 by means of a prime mover indicated at 14 which is adapted to drive, through the usual transmission arrangement (not shown), a ground-engaging crawler track 16.

The present improved earth moving blade assembly, generally indicated at 18, is in this instance supported at the front end of the dozer tractor 10 by means of a pivotable push linkage 20 which is pivotally supported on the dozer tractor 10. The push link connection 20 is adapted to push the blade assembly 18 along the ground when the dozer tractor 10 is moving forwardly. Additionally, the blade assembly 18 is pivotally connected to an extendable link 22, which other end is supported on the dozer tractor 10, in order to raise or lower the blade relative to the ground 12, as is well known in dozer constructions of this type.

It shall be mentioned here that the particular support arrangement for the improved earth moving blade assembly 18 on the earth moving machine with which it is associated, is of no importance to the construction and operation of the improved earth moving blade assembly and, therefore, forms no part of the present invention other than for descriptive purposes.

Figure 4:
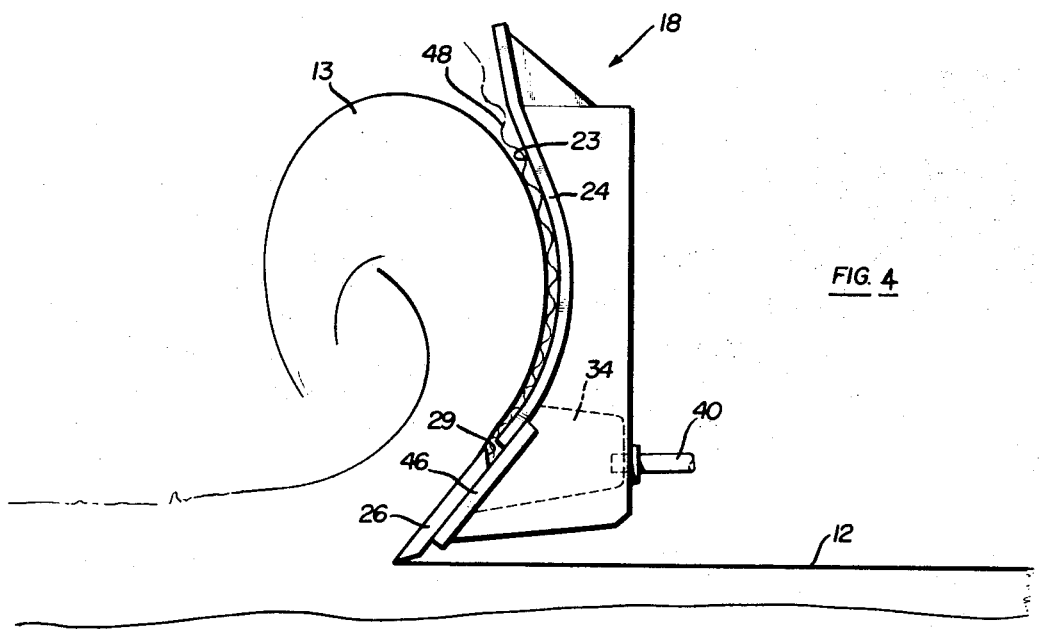
FIG. 4 is a schematic illustration of the operational characteristic of the present improved earth moving blade.
Figure 2:
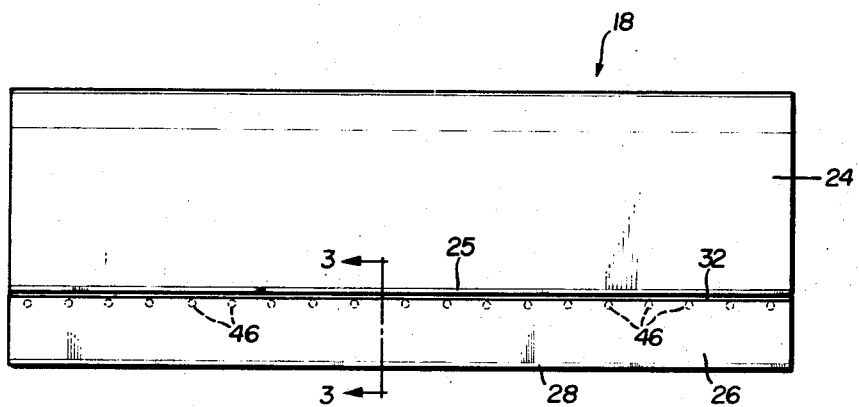
FIG. 2 is a separate front plan view of the improved earth moving blade of FIG. 1.
Figure 3:
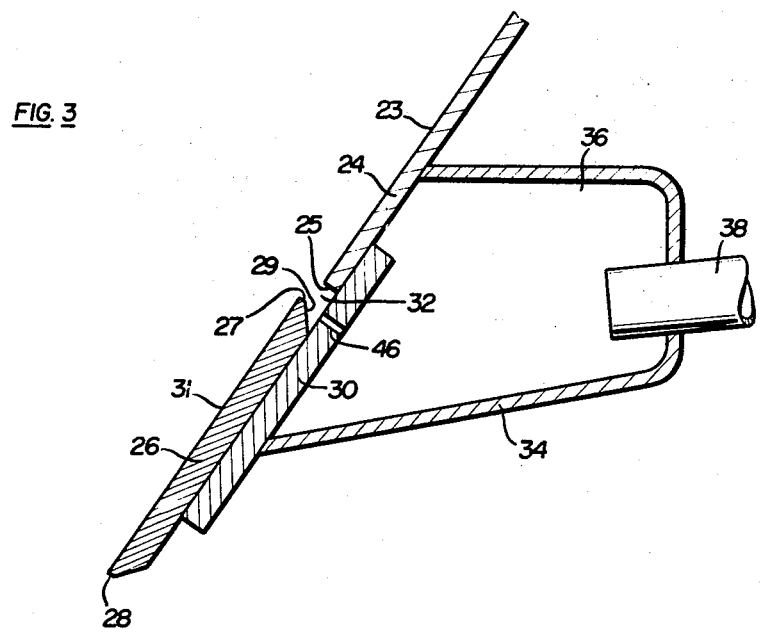
FIG. 3 is an enlarged partial cross-section through the lower portion of the improved earth moving blade as seen in the direction of the arrows 3—3 in FIG. 2.

With additional reference to FIGS. 2 and 3 of the drawings, the present improved earth moving blade assembly 18 is comprised generally of soil deflecting moldboard portion 24, providing the upper section of the blade assembly and which is generally curvilinearly shaped, as seen in FIGS. 1 and 4. The lower end of the blade assembly 18 is comprised of a soil cutting portion 26 having a ground engaging cutting edge 28 at its lower end. As particularly seen in FIG. 3, the soil cutting portion 26 and the moldboard portion 24 are connected together and attached to a back support plate 30 extending in longitudinal direction of the blade assembly 18. The lower edge 25 of the moldboard portion 24 and the upper edge 27 of the soil cutting portion 26 are spaced from each other a small distance to provide a longitudinal gap 32, extending across the width of the blade assembly 18, which is bridged by the back plate 30. The back plate 30 is suitably fastened to both the moldboard portion 24 and the soil cutting portion 26 by means of welding or by bolts or the like, to provide a substantially solid unitary blade structure. Conversely, the blade portions 24, 26 and back plate 30 may be made in one piece if preferred.

At the rear of the improved blade assembly 18 a housing 34 is provided which is suitably secured, such as by welding or the like, to the rear of the moldboard portion 24 and to the rear of the back plate 30. The housing 34 defines a fluid chamber 36 provided at the rear with a fluid inlet 38.

As schematically illustrated in FIG. 1, the fluid inlet 38 of the fluid chamber 36 is connected by a conduit 40 to a source of fluid under pressure, such as a compressor 42, supported on the dozer machine 10. The actuating fluid being used is preferably air and the source of fluid pressure constitutes an air compressor 42 operably connected to the prime mover 14 of the machine 10 in any conventional manner for operation thereby. Preferably, a regulator valve 44 is installed in the fluid conduit 40 to enable the operator of the machine 10 to control the required air pressure in response to the density and condition of the soil moved by the blade assembly 18.

Referring again to FIG. 3, the fluid chamber 36 is in constant communication with the atmosphere by means of a plurality of orifices 46 provided in the back support plate 30 along the line of the gap 32 between the moldboard portion 24 and the soil cutting portion 26. The diameter of the orifices 46 is relatively small which, however, depends on the number of orifices being used in any particular blade construction.

It will be noted from FIG. 3, that the cross-sectional thickness of the moldboard portion 24 is considerably less than the cross-sectional thickness of the soil cutting portion 26, causing the soil engaging surface 31 of the soil cutting portion 26 to be spaced forwardly a greater distance than the soil engaging surface 23 of the moldboard portion 24, for a purpose to appear.

It will also be noted from FIG. 3, that the upper edge 27 of the soil cutting portion 26 extends partially or entirely over the orifices 46 and has an inner portion 29 cut back at an angle to join the back plate 30 along a line spaced below the orifices 46. By this construction, fluid, such as air, which exits under pressure through the orifices 46 is deflected upwardly by the inclined surface 29 to flow along the surface 23 of the moldboard portion 24. Likewise, due to the overhang of the edge 27, the orifices are protected against clogging by the soil moving across the orifices. Instead of providing the inclined surface 29 along the upper edge of the cutting portion 26, a separate deflector strip (not shown) may be disposed within the gap 32 for extension below and along the orifices 46.

The operation and characteristic of the present improved arrangement will be best understood by the description of the operation thereof, with reference to the schematic illustration in FIG. 4.

With reference now to the illustration in FIG. 4, in the working condition of the earth working machine 10, the earth moving blade assembly 18 is lowered unto the ground by means of the extendable link assembly 22 (FIG. 1) so that the lower cutting edge 28 is disposed on the ground. As the earth working machine 10 moves forwardly, continued downward force exerted on the blade assembly 18 by the extendable link 22 forces the cutting portion 26 of the blade assembly 18 into the ground 12 a distance predetermined by ground condition and the length of the extension of the link 22. The push linkage 20, upon forward movement of the machine 10, moves the blade assembly 18 through the ground in the direction of movement of the machine 10 to break masses of surface soil 13 from the ground which, upon continuous forward movement of the blade assembly 18, continuously move upwardly and around the curvilinear moldboard portion 24 of the blade assembly 18.

Upon starting of the work operation of the machine 10, the prime mover 14 starts to drive the compressor 42 which causes pressurized air to flow through the regulator valve 44 and conduit 40 into the pressure chamber 36 behind the blade assembly 18. After buildup of sufficient pressure within the pressure chamber 36, the pressurized air is forced out through the orifices 46 between the upper edge of the cutting portion 26 and the lower edge of the moldboard portion 24. Due to the inclined configuration of the upper edge 27–29 of the cutting portion 26, pressurized air ejected through the orifices 46 is deflected upwardly. Because of the broken-loose mass of soil 13 which is forced against the surfaces 31 and 23 of the blade assembly 18, the pressurized air ejected through the orifices 46 is forced upwardly along the curvilinear surface 23 of the moldboard portion 24, as indicated in FIG. 4, and thereby provides an effective air cushion between the mass of loose soil 13 and the blade assembly 18.

It will be noted from the illustration in FIG. 4 that, due to the increased thickness of the lower soil cutting portion 26, the broken loose mass of soil 13, as it moves up on the cutting portion 26 towards the curvilinear moldboard portion 24, is being kept away from the orifices 46 to thereby permit pressurized air exiting from the orifices 26 to get in between the mass of soil 13 and the mold-board surface 23. As mentioned before, in connection with the description of FIG. 3, the upper edge 27 of the cutting portion 26 partially or entirely overlies the orifices 46, and this arrangement, together with the air pressure present in the gap 32 between the soil cutting portion 26 and the mold-board portion 24 positively prevents any soil particles from clogging the orifices 46.

It is clearly seen from the illustration in FIG. 4 that, as the broken-loose mass of soil 13 is moved upwardly on the soil cutting portion 26 — which surface 31 extends forwardly beyond the surface 23 of the moldboard 24 — the mass of soil 13 passes freely over the gap 32 and the pressurized air ejected through the plurality of orifices 46 disposed along the gap 32 form a continuous air cushion or film 48 along the curvilinear surface 23 of the moldboard 24, and considerably aids in moving the broken-loose mass of soil 13 upwardly along the moldboard 24 over the air cushion 48 in substantially frictionless fashion.

It is evident from the foregoing description, in connection with the attached drawings, that the present improved earth moving blade assembly provides an effective air cushion along the moldboard of the blade to thereby reduce friction between the mass of soil broken loose from the ground and the blade and simultaneously prevents adherence of any soil particles to the blade surface. The primary feature herein is the positioning of the air orifices and construction of the surrounding outer surfaces of the blade in such a manner as to positively prevent any soil particles from clogging up the orifices, which has been a primary problem in known arrangements of this type.

Air, as a fluid cushion means, is preferred because it is easily available and also needs only a compressor which can be conveniently driven by the prime mover of the earth working machine to provide the desires pressurized air flow over the moldboard surface of the blade assembly. The pressurized fluid film tends to separate the soil from the blade surface, thereby considerably reducing draft.

Although the present invention has been described in connection with a preferred embodiment schematically illustrated in the drawings, it is evident that various modifications in structure can be asserted to by a person skilled in the art to which the invention pertains without departing from the spirit and essential characteristics thereof, therefore, the present embodiment is considered to be in all respects as illustrative only and not restrictive, the scope of the invention being indicated by the appended claims rather than by the foregoing description.

I claim:

1. An earth moving blade assembly for a dozer or the like comprising:
   a back plate support;
   a cutting blade attached to the lower portion of the back plate having a lower cutting edge adapted for digging into a mass of soil and an upper edge substantially parallel to the cutting edge;
   a moldboard attached to the upper portion of the back plate having a lower edge spaced a predetermined distance from the upper edge of the cutting blade;
   a fluid pressure chamber integrally attached to the rear of said back plate and said moldboard and fluidly connected to a source of fluid under pressure, said back plate being provided with a plurality of orifices longitudinally spaced therealong on a line defined by the space between the upper edge of said cutting blade and the lower edge of said moldboard, and deflector means having an upwardly inclined rear surface opposite said orifices adapted to direct fluid upwardly along said moldboard and prevent clogging of said orifices by said soil, said orifices providing fluid communication between said fluid pressure chamber and the atmosphere so that, upon application of fluid pressure from said source of fluid pressure, fluid will be forcibly ejected through said orifices to the atmosphere at a location immediately adjacent the upper edge of said cutting blade against said inclined surface to move along said moldboard to thereby prevent adhesion of said soil, dug up by the operation of said cutting blade, to said moldboard.

2. The blade assembly as defined in claim 1, said upper edge of said cutting blade having an inclined rear surface defining said deflector means and at least partially overlying said orifices.

3. The blade assembly as defined in claim 2, said cutting blade having a cross-sectional thickness larger than the cross-sectional thickness of said moldboard to provide an outer surface which is spaced from the outer surface of said back plate a greater distance than the outer surface of said moldboard to cause said fluid ejected through said orifices to move between said mass of soil and said surface of said moldboard to provide a frictionless fluid cushion between said soil and said moldboard.

4. In combination with an earth moving machine such as a dozer or scraper having a prime mover for movement of said machine along a ground surface and an earth moving blade assembly connected thereto for movement therewith which is adapted to dig into a mass of soil of said ground when said machine is in earth moving position, the improvement comprising;
   said blade assembly having a lower cutting portion and a moldboard portion spaced upwardly therefrom in coacting relationship thereto;

a fluid chamber disposed rearwardly of said cutting portion and said moldboard portion provided with a plurality of orifices extending from the interior of said chamber to the outer surface of said blade assembly between said cutting portion and said moldboard portion;

a source of fluid under pressure disposed in said machine and fluidly connected to said fluid chamber;

means associated with said prime mover to actuate said source to thereby convey fluid under pressure into said fluid chamber and through said orifices between said cutting portion and said moldboard portion;

and deflector means disposed along the upper edge of said cutting portion adjacent and below said orifices having an upwardly inclined rear surface opposite said orifices for deflecting said fluid from said orifices to provide a continuous film of fluid along said moldboard portion when said blade is in working position to prevent said mass of soil from adhering to the outer surface of said moldboard portion, and to prevent clogging of said orifices by soil.

* * * * *